Aug. 11, 1953 G. S. DOMAN 2,648,387
ROTOR HEAD
Filed June 27, 1946 3 Sheets-Sheet 1

INVENTOR.
GLIDDEN S. DOMAN
BY
ATTORNEYS

Aug. 11, 1953

G. S. DOMAN 2,648,387

ROTOR HEAD

Filed June 27, 1946

INVENTOR.
GLIDDEN S. DOMAN
BY
ATTORNEYS

Aug. 11, 1953　　　　　G. S. DOMAN　　　　　2,648,387
ROTOR HEAD
Filed June 27, 1946　　　　　　　　　　　　3 Sheets-Sheet 3

INVENTOR.
GLIDDEN S. DOMAN.
BY
ATTORNEYS

Patented Aug. 11, 1953

2,648,387

UNITED STATES PATENT OFFICE 2,648,387

ROTOR HEAD

Glidden S. Doman, Stamford, Conn., assignor to Doman Helicopters, Inc., a corporation of Delaware Application June 27, 1946, Serial No. 679,695

13 Claims. (Cl. 170—135.75)

The invention relates to a rotor head for helicopters and the like which utilize sustaining rotors. Rotor heads may be constructed in which the blades are mounted upon hinges for flapping of the blades or may be rigidly attached to the rotor hub except for pitch changes of the blades. The principal feature of the invention herein is applicable to the rigid or fixed blade type of rotor head although certain features which are most useful with respect to this type of head also have applicability with the flapping hinge type of head.

It is an object of the invention to construct a rotor head in which no bearing is subjected to full blade or drive torques.

Another object of the invention is to construct a new and novel sustaining rotor of the type which is mounted for unrestrained universal inclination.

Another object of the invention is to construct a rotor head having blades mounted for pitch change in which the blade bearings are entirely unloaded of centrifugal axial load or at least from a large part of the centrifugal force created by a rotating blade.

Another object of the invention is to construct a rotor head in which the head is unrestrained against universal inclination and in which the pitch of the blades may be varied as desired either collectively or cyclically or both and in which the blade bearings are unloaded of centrifugal forces for unrestrained pitch angle change of the blades.

A further object is to construct a rotor head having blades, the pitch of which is controlled by an azimuth plate in which the entire vertical lift of the rotor is carried by one universal joint and the drive torque for the rotor is transmitted through a separate universal joint which carries torque loads only.

Another object is to construct a rotor head of new and novel design.

Other objects of the invention will be more apparent from the following description when taken in connection with the accompanying drawings illustrating preferred embodiments thereof in which.

Figure 1:
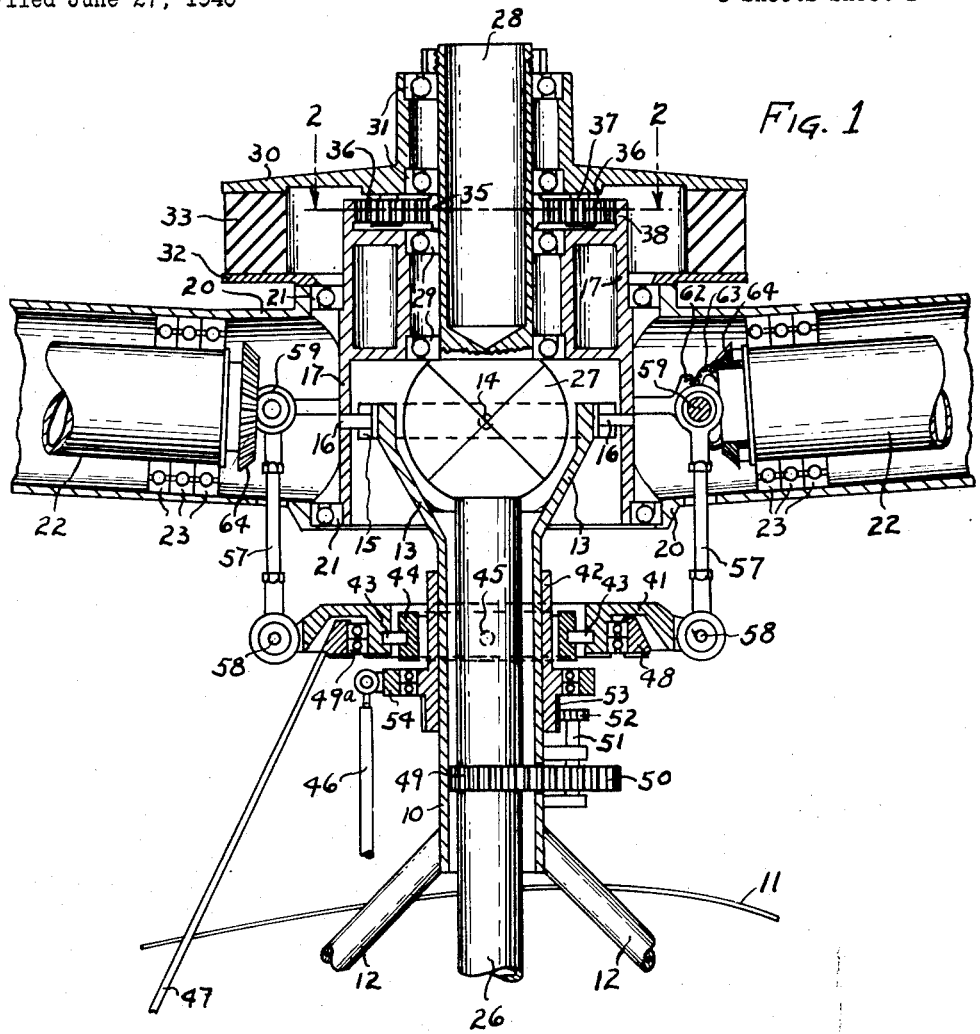
Figure 1 is a vertical section through the head taken on line 1—1 of Figure 3.

The rotor head includes a mast or pylon 10 which may be secured to the fuselage 11 of the aircraft in any suitable fashion such as by a tripod 12. The mast carries a universal joint including a cone 13 upon which is carried pivots 14 for pivotally securing a ring 15 thereto. The ring is pivotally secured by pivots 16 to a shell or auxiliary mast 17. The pivots 14 and 16 are at right angles to each other so that the shell 17 is universally mounted upon the mast but is held or anchored against rotation by the pivots and mast.

A rotor or blade hub 20 is rotatably mounted upon the shell 17 such as by ball bearings 21. The rotor hub carries a plurality of blades having blade shafts 22 which are mounted, for pitch change or feathering along the longitudinal axis of the blade, upon a blade shaft bearing which may be made up of a series of ball bearings 23. Two or more blades may be used, although four blades are illustrated. The inboard ball bearings only are shown in Figure 1.

The rotor hub is connected with the motor of the aircraft, in order to drive the same, through a drive shaft 26 which extends through the mast 10 and carries a universal joint 27 through which a universally inclinable portion 28 of the drive shaft is driven. This universal joint 27 is preferably of the constant velocity type. The inclinable portion of the drive shaft is supported upon bearings 29 carried by the shell 17. A suitable torque mechanism may be used such as including a torque spider 30 rotatably mounted upon the inclinable portion 28 of the drive shaft upon bearings 31 which torque spider is connected with an intermeshing torque spider 32 carried by the rotor hub. The torque spiders have rubber blocks 33 between the two spiders which serve to isolate the motor and drive mechanisms from torque impulses originating in the rotor.

Figure 2:
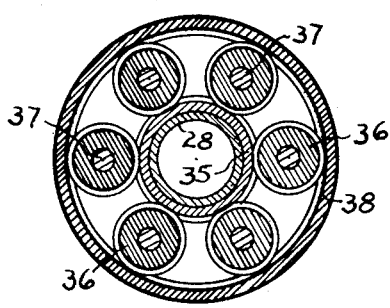
Figure 2 is a cross-section through the planetary gear driving mechanism taken on line 2—2 of Figure 1.

A reduction gear drive means is provided between the inclinable portion 28 of the drive shaft and the torque spider. Preferably the gear reduction is of the planetary gear type including a pinion or sun gear 35 fixed upon the inclinable portion of the drive shaft and rotatable thereby. A series of planetary gears 36, shown in Figure 2, is mounted upon the torque spider 30, each gear being carried upon its respective pin 37 which is secured to the spider. The planetary gears mesh with the pinion 35 and a ring gear 38 carried by the shell 17. The ring gear 38 is stationary, that is it does not rotate, so that rotation of the pinion 37, turns the planetary gears 36 and gives them planetary rotation around the drive shaft and hence, rotates the torque spider and rotor head at the speed desired for the head.

It will be noted that the shell 17 and hence the rotor hub and its blades are unrestrained in any manner within the limits of movement of the shell upon its universal joint and therefore the rotor is universally free to assume any angle of inclination. This universal freedom of movement of the rotor which in conjunction with the cyclic pitch change of the blades, to be described hereinafter, gives the ship gust stability in that a gust of wind from any direction permits the rotor to tilt freely in response thereto while pitch change of the blades extending laterally of the gust also takes place as will appear hereinafter.

The rotor head described constitutes a low torque head in that no bearings are subjected to the full torque of the rotor blades. In any flapping hinge or gimbal type of construction, the hinge must carry the full driving torque applied to the blade and in addition thereto are subject to rapid brinnelling or uneven wear of the hinge bearings because of cyclic pitch change and other small amplitude and continuous blade motions under these heavy torque loads. Such uneven wearing of the bearings requires constant replacement thereof because it interferes with free motions of the blades thus introducing roughness of rotor operation and improper response to the pilot's control. In the construction herein there is no bearing subjected to torque between the blades and the universal joint 27 in the drive shaft. Because this universal joint 27 is on the motor side of the gear reduction means, the torques therein have a magnitude in inverse proportion to the gear reduction ratio. It is for this reason that a constant velocity universal joint 27, which normally would be excessive in size if it carried full blade torque, may be used since the reduced torque enables a relatively small joint to be utilized. A substantial reduction in the required diametrical dimensions of the rotor head results. This is particularly true where the drive shaft universal joint 27 is in axial or concentric alignment with the sleeve or mast universal joint. Such reduction in the size of the drive shaft joint enables reductions to be made in the size of the mast universal joint and of the other rotor parts so that a substantial reduction in the weight of the head is achieved.

The pitch change or feathering mechanism for the blades, may be of any suitable form such as that shown including an azimuth plate 41 which is universally mounted upon a sleeve 42 by means of pivots 43, ring 44 and pivots 45, the latter pivots being at right angles to the pivots 43. The sleeve 42 is slidable on the mast 10 and its vertical position may be adjusted by vertical movement of the connecting link or push rod 46 which is attached to a ring 54 mounted upon the sleeve by ball bearings so that the ring and push rod do not rotate. The rod 46 may be moved and held in adjusted position by any suitable means not shown. The angular inclination of the azimuth plate may be controlled by a handle 47 which is attached to a non-rotatable ring 48 which is mounted upon the azimuth plate by suitable bearings 49a. The azimuth plate is driven by a gear reduction means from the drive shaft which means includes a pinion 49 secured to the drive shaft 26 which pinion meshes with a gear 50 secured on the shaft 51 so that it turns a smaller gear 52 also secured thereto. The gear 52 meshes with gear teeth 53 carried by the sleeve 42 which gear teeth are relatively long so that the sleeve may be driven irrespective of the vertical position of the sleeve and azimuth plate.

Figure 3:
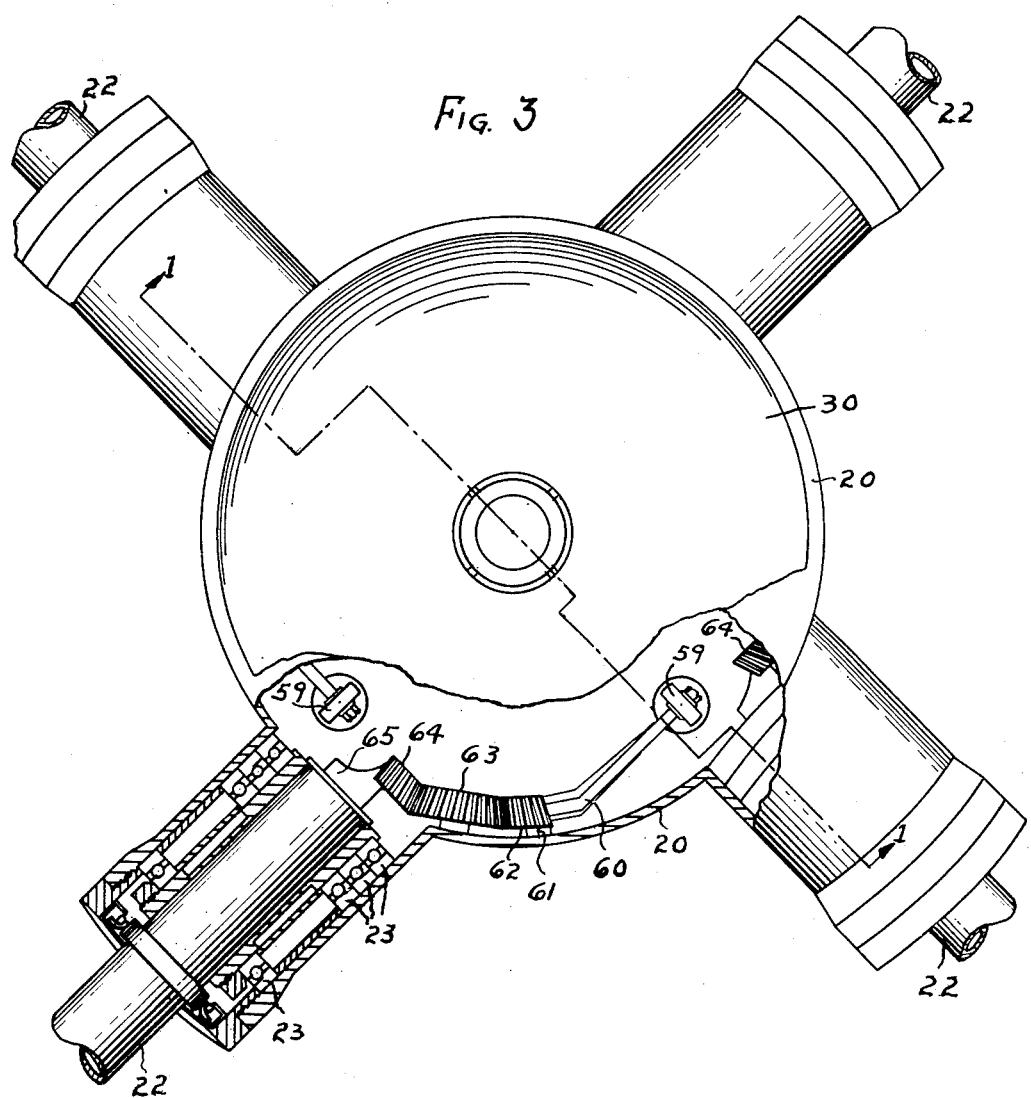
Figure 3 is a plan view of the rotor head with a portion thereof in section to show the blade pitch changing means.

The azimuth plate is connected with each blade shaft through a connecting link 57 which is secured at one end by a pivot 58 to the azimuth plate, the other end being connected through a swivel joint 59 to an arm 60 carried upon a pivot 61 mounted in the rotor hub 20 as shown in Figure 3. The arm carries a segmental gear 62 which meshes with an idler gear 63, the latter gear meshing with a segmental gear 64 carried by the blade shaft 22. It will be noted that the pitch or feathering inclination of each blade is controlled from a point on the azimuth plate which is 90° spaced from the blade or approximately so and is shown connected thereto 90° forwardly of the blade with respect to its direction of rotation.

Vertical movement of the azimuth plate by manipulation of the connecting rod 46 controls collective pitch change of the blade angle in that all blades are changed the same amount. Inclining of the azimuth plate with respect to the mast by the handle 47 produces cyclic pitch change of the blades for each revolution of the rotor and controls lateral flight of the ship. Any inclination of the rotor due to gusts of wind which is permitted by the unrestrained universal mounting thereof, results in a maximum cyclic change of the pitch of each of the blades when its position in rotation is at 90° to the direction of the tilt of the rotor but does not affect any pitch change of the blades when they are longitudinally of the direction of tilt of the rotor.

The mechanism for changing the pitch of the blade is easily modified to change the ratio of pitch change to azimuth plate inclination relative to the rotor by selecting the gear ratios of the gear segments 64 and 62. Similarly the gear connection shortens the relative length of the arm 60, thereby increasing the ratio of angular change of the arm with respect to the azimuth plate. In other words the shorter the arm 60, the greater the angular change of the arm under cyclic pitch variations induced by an angular inclination of the azimuth plate relative to the rotor so that there is a double angular magnification available first in the gear ratios selected, and secondly in the length of the arms 60.

Figure 4:
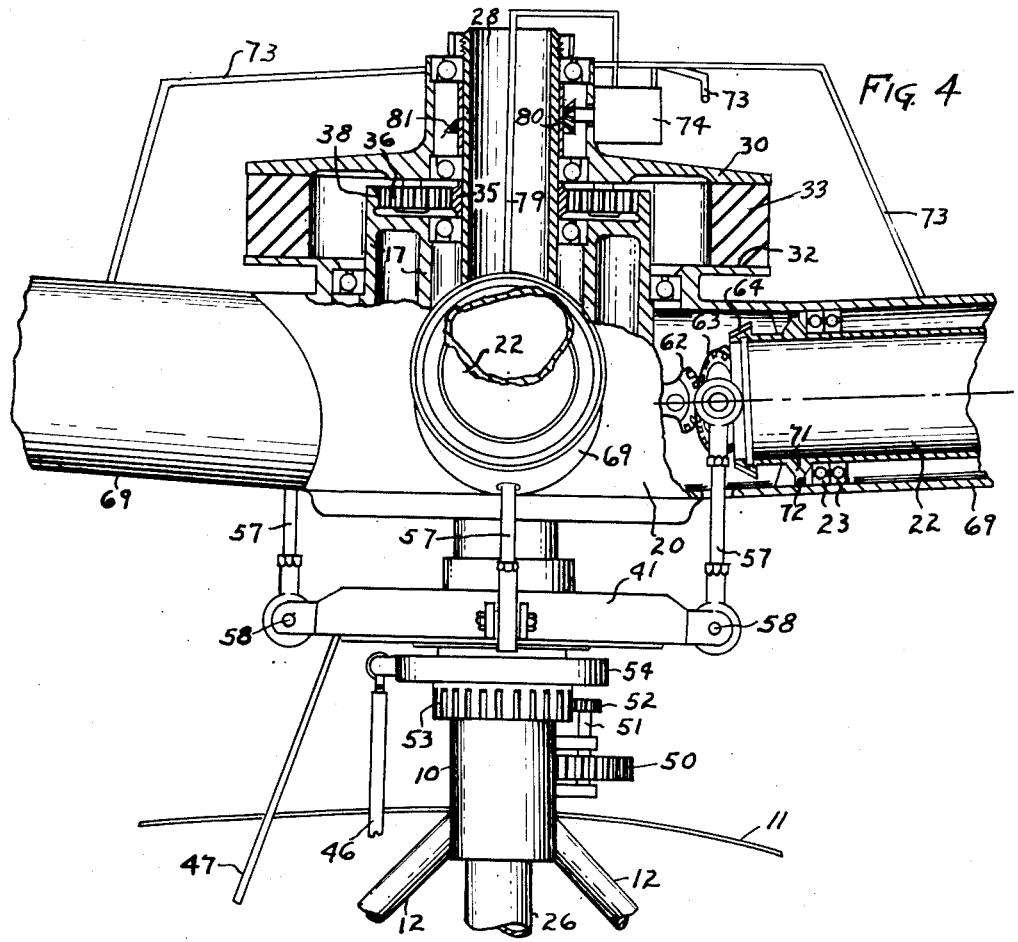
Figure 4 is a partial section of the head of Figure 1 but with hydraulic means for unloading each blade bearing from the centrifugal force of its blade.
Figure 5:
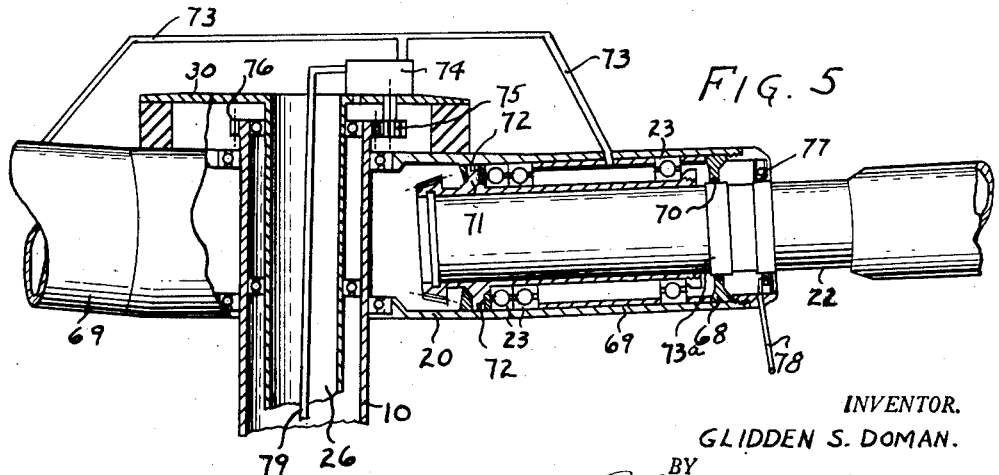
Figure 5 is a vertical section through a rotor head of the rigid type showing hydraulic means to unload a blade bearing from the centrifugal force exerted by the blade mounted in the bearing.

The bearings 23 which mount each blade shaft 65 for pitch change or feathering of the blade are subjected to a large axial centrifugal force exerted by its rotating blade. This axial force on each bearing substantially increases the force necessary to be applied to feather the blade or change its pitch angle which force is transmitted to the azimuth plate and makes any change in its inclinations difficult. Means are provided to unload each blade bearing of at least a large part of the centrifugal force and preferably of all of it. The bearing unloading means is individual to each blade bearing and preferably is associated with the blade shaft bearings. An hydraulic bearing unloader, as illustrated in Figure 4, is incorporated with the head illustrated in Figure 1. The blade bearing unloading mechanism has general applicability and may be used with rotor heads which are universally mounted as shown in Figure 4, or which are rigidly mounted as shown in Figure 5. The blade unloading means of Figure 5 is the same as that partially shown in the head of Figure 4. The bearing unloader mechanism may be utilized with any blade which is mounted for pitch change whether such change is secured with an azimuth plate or by other constructions.

The blade unloading means particularly illustrated is an hydraulic means and includes a flange 68 carried by the sleeve 69 forming a part of the rotor hub 20. The inner diameter of the flange is provided with an hydraulic seal 70 where it engages the blade shaft 22 or particularly a collar 73 carried thereby. The flange is preferably carried on the outboard side of the ball bearings 23. A flange 71 is secured to the blade shaft 22 and has an hydraulic seal 72, at the outer periphery thereof which contacts with the interior of the hub sleeve 69. This flange is preferably located on the inboard side of the shaft bearings 23.

A fluid connection 73 is made with the interior of the bearing sleeve 69 between the flanges. Such fluid connection is made with the bearing unloading means for each blade shaft. The fluid connection 73 connects with a fluid pump 74 which may be located anywhere desired and is shown as carried upon the rotor hub to rotate therewith and is driven from the stationary tube 10 in any suitable fashion such as by a pinion 75 which meshes with a stationary gear 76 carried by the mast 16. In the head of Figure 4, the pump is driven by a bevel gear 80 which meshes with a pinion 81 secured to the drive shaft 28.

It is desirable to assure that such fluid as may leak out past the fluid seal 70 for the flange 68 be arrested by a second fluid seal 77, which is therefore provided on the outboard side of the flange 68 which second seal may be of any suitable kind and constitutes a low pressure seal. Any fluid which may leak past the flange seal 70 flows out of the chamber between the flange 68 and the seal 77 through a pipe 78. The pump may be connected with a fluid supply through a pipe 79 extending through the drive shaft 26.

The bearing sleeve 69 with the flange 68 and flange 71 are in effect a fluid cylinder and piston respectively in that the fluid pressure from the pump 74 is maintained within the bearing housing which pressure is exerted against the flange 71 inwardly towards the center of rotation of the rotor and carries or counteracts the outwardly directed centrifugal force of the blade. It is to be understood that the flange 71 may be of any desired diameter and it is clear that by increasing the size of the flange the necessary fluid pressure can be reduced or greater force is exerted with the same fluid pressure. It will be observed also that the fluid also supplies forced lubrication for the ball bearings 23.

The rotor head described in having blades which are fixed in relative position except with respect to pitch change provides a rotor which is free of Corolis effect. The freely tiltable rotor and allied control and bearing means as described above, provide a construction which gives excellent gust stability and is not limited as to the number of blades which may be utilized. The bearing in being unloaded of blade centrifugal forces enables the azimuth plate to be adjusted to any position with ease either manually by the pilot or by automatic means.

The blade center line may be offset from the axis of rotation as shown in Figure 3 which unloads the blade bearings and blade shafts of bending load arising from blade drag.

Also the offset provides ample space for any change in the gears of the gear means for varying the ratio of blade pitch change with respect to azimuth plate inclination. Again with the gear means for pitch change of the blades the gear ratio may be selected to decrease the gust stabilizing cyclic pitch change if desired to offset the increase in gust stabilizing cyclic pitch change occasioned by the offset of the blade axis. The gear ratio may be selected in accordance with the amount of blade offset which may be built into the rotor.

The construction of the rotor head described herein enables the blades to be mounted with a fixed built-in coning angle designed for dynamic relief of average vertical lift load. The unrestrained universal mounting of the rotor enables the latter to vary or change its inclination under any unsymmetrical lift condition which may occur from gusts or otherwise with the result that the blades are subjected only to minor bending loads of frequencies higher than one cycle per revolution. With the construction of head described including the universally free rotor and fixed blade coning, the major bending loads of one cycle per revolution and the steady blade bending due to average lift force have been eliminated.

This invention is presented to fill a need for improvements in a rotor head. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A rotor head for helicopters and the like comprising a mast adapted to be fixed to the fuselage, a shell having a joint universally mounting the same upon the mast and held against rotation with respect thereto, a blade hub rotatably mounted upon the shell and unrestrained against universal inclination, blades mounted upon the blade hub for pitch angle change upon the longitudinal axis of each blade and with a fixed mounting with respect to all other angular positions, means connected with the blades to change the pitch angle of the latter, a drive shaft extending through the mast and shell and having a universal joint concentric with the shell joint whereby the shaft has an inclinable portion, a bearing carried by the shell and supporting the inclinable portion of the drive shaft, and a gear reduction connection between the inclinable portion of the drive shaft and the blade hub.

2. A rotor head for helicopters and the like comprising a mast adapted to be fixed to a fuselage, a shell having a joint universally mounting the same upon the mast and held against rotation with respect thereto, a blade hub rotatably mounted upon the shell and unrestrained against universal inclination, blades mounted upon the blade hub for pitch angle change upon the longitudinal axis of each blade and with a fixed mounting with respect to all other angular positions, means connected with the blades to change the pitch angle of the latter, a drive shaft extending through the mast and shell and having a universal joint concentric with the shell joint whereby the shaft has an inclinable portion, a driving connection between the drive shaft and blade hub including a pinion carried by the inclinable portion of the drive shaft, a ring gear carried by the shell, and a planet pinion carried by the rotor hub and meshing with the pinion and ring gear.

3. A rotor head for helicopters and the like comprising a mast adapted to be fixed to a fuselage, a shell having a joint universally mounting the same upon the mast and held against rotation with respect thereto, a blade hub rotatably mounted upon the shell and unrestrained against universal inclination, blades mounted upon the blade hub for pitch angle change upon the longitudinal axis of each blade and with a fixed mounting with respect to all other angular positions, means connected with the blades to change the pitch angle of the latter, a drive shaft extending through the mast and shell and having a universal joint concentric with the shell joint whereby the shaft has an inclinable portion, bearing means carried by the shell and supporting the inclinable portion of the drive shaft, a resilient torque driving connection torque spider rotatably mounted upon the inclinable portion of the drive shaft and connected with the rotor hub, a driving connection between the drive shaft and blade hub including a pinion carried by the inclinable portion of the drive shaft, a ring gear carried by the shell, and a planet pinion carried by the torque spider and meshing with the pinion and ring gear.

4. A rotor head for helicopters and the like comprising a mast adapted to be fixed to a fuselage, a shell having a joint universally mounting the same upon the mast and held against rotation with respect thereto, a blade hub rotatably mounted upon the shell and unrestrained against universal inclination, blades mounted upon the blade hub for pitch angle change upon the longitudinal axis of each blade and with a fixed mounting with respect to all other angular positions, means connected with the blades to change the pitch angle of the latter, a drive shaft extending through the mast and shell and having a universal joint concentric with the shell joint whereby the shaft has an inclinable portion, bearing means carried by the shell and supporting the inclinable portion of the drive shaft, a torque spider rotatably mounted upon the inclinable portion of the drive shaft and connected with the rotor hub, a driving connection between the drive shaft and blade hub including a pinion carried by the inclinable portion of the drive shaft between the shell bearing and the torque spider, a ring gear carried by the end of the shell, and a planet pinion carried by the torque spider and meshing with the pinion and ring gear.

5. A rotor head for helicopters and the like comprising a mast adapted to be fixed to a fuselage, a shell having a joint universally mounting the same upon the mast and held against rotation with respect thereto, a blade hub rotatably mounted upon the shell and unrestrained against universal inclination, blades mounted upon the blade hub for pitch angle change upon the longitudinal axis of each blade and with a fixed mounting with respect to all other angular positions, means carried by the mast and connected with the blades to change the pitch angle thereof, a drive shaft extending through the mast and shell and having a universal joint concentric with the shell joint whereby the shaft has an inclinable portion, a driving connection between the inclinable portion of the drive shaft and blade hub, and a gear reduction means between the drive shaft and the pitch change means to positively rotate the latter with the rotor.

6. A rotor head for helicopters and the like comprising a mast adapted to be fixed to a fuselage, a shell having a joint universally mounting the same upon the mast and held against rotation with respect thereto, a blade hub rotatably mounted upon the shell and unrestrained against universal inclination, blade bearings carried by the hub for rotatively mounting each blade upon the latter's longitudinal axis, a blade mounted in each blade bearing for pitch angle change upon the longitudinal axis of each blade and with a fixed mounting with respect to all other angular positions, means individual to each blade and at the hub end thereof exerting a force towards the axis of rotation of the rotor to counteract centrifugal force of the blade thereby unloading the blade bearing of at least a large part of the axial load, means connected with the blades to change the pitch angle of the latter, a drive shaft extending through the mast and shell and having a universal joint concentric with the shell joint whereby the shaft has an inclinable portion, bearing means carried by the shell and supporting the inclinable portion of the drive shaft, and a driving connection between the inclinable portion of the drive shaft and blade hub.

7. A rotor head for helicopters and the like comprising a mast adapted to be fixed to a fuselage, a shell having a joint universally mounting the same upon the mast and held against rotation with respect thereto, a blade hub rotatably mounted upon the shell and unrestrained against universal inclination, blade bearings carried by the hub for rotatively mounting each blade upon the latter's longitudinal axis, a blade mounted in each blade bearing for pitch angle change upon the longitudinal axis of each blade and with a fixed mounting with respect to all other angular positions, means associated with each blade bearing exerting a force towards the axis of rotation of the rotor to counteract centrifugal force of the blade thereby unloading the blade bearing of at least a large part of the axial load, means connected with the blades to change the pitch angle of the latter, a drive shaft extending through the mast and shell and having a universal joint concentric with the shell joint whereby the shaft has an inclinable portion, bearing means carried by the shell and supporting the inclinable portion of the drive shaft, and a driving connection between the inclinable portion of the drive shaft and blade hub.

8. A rotor head for helicopters and the like comprising a mast adapted to be fixed to a fuselage, a shell having a joint universally mounting the same upon the mast and held against rotation with respect thereto, a blade hub rotatably mounted upon the shell and unrestrained against universal inclination, blade bearings carried by the hub for rotatively mounting each blade upon the latter's longitudinal axis, a blade having a blade shaft mounted in each blade bearing for pitch angle change upon the longitudinal axis of each blade and with a fixed mounting with respect to all other angular positions, hydraulic means carried by the hub for each blade shaft including a piston carried by the blade shaft, a fluid pressure pump carried on the head and connected with the hydraulic means to exert a force upon the piston and blade shaft towards the axis of rotation of the rotor head to counteract centrifugal force of the blade thereby unloading the blade bearing of axial load, means connected with the blades to change the pitch angle of the latter, a drive shaft extending through the mast and shell and having a universal joint concentric with the shell joint whereby the shaft has an inclinable portion, bearing means carried by the shell and supporting the inclinable portion of the drive shaft, a driving connection between the inclinable portion of the drive shaft and rotor hub, and a drive connection for the pump.

9. A rotor head for helicopters and the like comprising a mast adapted to be fixed to a fuselage, a shell having a joint universally mounting the same upon the mast and held against rotation with respect thereto, a blade hub rotatably mounted upon the shell and unrestrained against universal inclination, blade bearings carried by the hub for rotatively mounting each blade upon the latter's longitudinal axis, a blade having a blade shaft mounted in each blade bearing for pitch angle change upon the longitudinal axis of each blade and with a fixed mounting with respect to all other angular positions, a flange for each blade shaft carried by the hub and having an hydraulic seal at its inner periphery with its respective blade shaft, a flange carried by each blade shaft and having an hydraulic seal with the hub at its outer periphery, fluid pressure means connected between the flanges to exert a force towards the axis of rotation of the rotor to counteract centrifugal force of the blade thereby unloading the blade bearing of at least a large part of the axial load, means connected with the blades to change the pitch angle of the latter, a drive shaft extending through the mast and shell and having a universal joint concentric with the shell joint whereby the shaft has an inclinable portion, bearing means carried by the shell and supporting the inclinable portion of the drive shaft, and a driving connection between the inclinable portion of the drive shaft and the rotor hub.

10. A rotor head for helicopters and the like comprising a mast adapted to be fixed to a fuselage, a shell having a joint universally mounting the same upon the mast and held against rotation with respect thereto, a blade hub rotatably mounted upon the shell and unrestrained against universal inclination, blade bearings carried by the hub for rotatively mounting each blade upon the latter's longitudinal axis, a blade having a blade shaft mounted in each blade bearing for pitch angle change upon the longitudinal axis of each blade and with a fixed mounting with respect to all other angular positions, a flange for each blade shaft carried by the hub upon the outboard side of the blade bearings and having an hydraulic seal at its inner diameter with its respective blade shaft, a flange carried by each blade shaft inboard of the blade bearing and having an hydraulic seal with the hub at its outer periphery, fluid pressure means connected between the flanges to exert a force towards the axis of rotation of the rotor head to counteract centrifugal force of the blade thereby unloading the blade bearing of axial load and lubricating the blade bearing, means connected with the blades to change the pitch angle of the latter, a drive shaft extending through the mast and shell and having a universal joint concentric with the shell joint whereby the shaft has an inclinable portion, bearing means carried by the shell and supporting the inclinable portion of the drive shaft, and a driving connection between the inclinable portion of the drive shaft and rotor hub.

11. A rotor head for helicopters and the like comprising a mast adapted to be fixed to a fuselage, a shell having a joint universally mounting the same upon the mast and held against rotation with respect thereto, a blade hub rotatably mounted upon the shell and unrestrained against universal inclination, blade bearings carried by the hub for rotatively mounting each blade upon the latter's longitudinal axis, a blade having a blade shaft mounted in each blade bearing for pitch angle change upon the longitudinal axis of each blade and with a fixed mounting with respect to all other angular positions, a flange for each blade shaft carried by the hub upon the outboard side of the blade bearing and having an hydraulic seal at its inner diameter with its respective blade shaft, a flange carried by each blade shaft inboard of the blade shaft bearing and having an hydraulic seal with the hub at its outer periphery, fluid pressure means connected between the flanges to exert a force upon the inboard flange and blade shaft towards the axis of rotation of the rotor to counteract centrifugal force of the blade thereby unloading the blade shaft bearing of axial load and lubricating the blade bearing, a second flange carried by the hub to catch fluid escaping the outboard flange, means connected with the blades to change the pitch angle of the latter, a drive shaft extending through the mast and shell and having a universal joint concentric with the shell joint whereby the shaft has an inclinable portion, bearing means carried by the shell and supporting the inclinable portion of the drive shaft, and a driving connection between the inclinable portion of the drive shaft and rotor hub.

12. A rotor head for helicopters and the like comprising a mast adapted to be fixed to a fuselage, a shell having a joint universally mounting the same upon the mast and held against rotation with respect thereto, a blade hub rotatably mounted upon the shell and unrestrained against universal inclination, blade bearings carried by the hub for rotatively mounting each blade upon the latter's longitudinal axis, a blade having a blade shaft mounted in each blade bearing for pitch angle change upon the longitudinal axis of each blade and with a fixed mounting with respect to all other angular positions, hydraulic means carried by the hub for each blade shaft including a piston carried by the blade shaft, a fluid pressure pump carried on the blade hub and connected with the hydraulic means to exert a force upon the piston and blade shaft towards the axis of rotation of the rotor head to counteract centrifugal force of the blade thereby unloading the blade bearing of axial load, means connected with the blades to change the pitch angle of the latter, a drive shaft extending through the mast and shell and having a universal joint concentric with the shell joint whereby the shaft has an inclinable portion, bearing means carried by the shell and supporting the inclinable portion of the drive shaft, a gear reduction driving connection between the inclinable portion of the drive shaft and rotor blade hub, and a drive connection for the pump with the inclinable portion of the drive shaft.

13. A rotor head for helicopters and the like whereby universal joint bearings are subjected to substantially reduced torque moments comprising a mast adapted to be fixed to a fuselage, a shell having a joint universally mounting the same upon the mast and held against rotation with respect thereto, a blade hub rotatably mounted upon the shell and unrestrained against universal inclination, blades mounted upon the blade hub for pitch angle change upon the longitudinal axis of each blade and with a fixed mounting with respect to all other angular positions, means connected with the blades to change the pitch angle of the latter, a drive shaft extending through the mast and shell and having a universal joint concentric with the shell joint whereby the shaft has an inclinable portion, a bearing carried by the shell and supporting the inclinable portion of the drive shaft, and a gear reduction connection between the inclinable portion of the drive shaft and the blade hub including a gear secured to the inclinable portion of the drive shaft, a gear carried by the shell, and a gear carried by the hub, the gears intermeshing to drive the rotor head.

GLIDDEN S. DOMAN.

References Cited in the file of this patent

UNITED STATES PATENTS

| Number | Name | Date |
|---|---|---|
| 1,919,089 | Breguet | July 18, 1933 |
| 1,986,709 | Breguet | Jan. 1, 1935 |
| 2,037,745 | Vaughn | Apr. 21, 1936 |
| 2,088,255 | Adams | June 27, 1937 |
| 2,163,893 | Schairer | June 27, 1939 |
| 2,205,835 | Landrum | June 25, 1940 |
| 2,216,164 | Schairer | Oct. 1, 1940 |
| 2,256,635 | Young | Sept. 23, 1941 |
| 2,256,918 | Young | Sept. 23, 1941 |
| 2,440,225 | Pullin | Apr. 20, 1948 |
| 2,444,070 | Stanley | Apr. 29, 1948 |

FOREIGN PATENTS

| Number | Country | Date |
|---|---|---|
| 274,973 | Great Britain | Aug. 2, 1927 |
| 480,747 | Great Britain | Feb. 25, 1938 |
| 671,693 | Germany | Feb. 11, 1939 |
| 794,520 | France | Feb. 19, 1936 |